Oct. 3, 1950     M. M. A. SEELOFF     2,524,142

FLUID VALVE

Filed May 19, 1944

Inventor
MELVIN M. A. SEELOFF
By Francis J. Klempay
Attorney

Patented Oct. 3, 1950

2,524,142

UNITED STATES PATENT OFFICE 2,524,142

FLUID VALVE

Melvin M. A. Seeloff, Warren, Ohio, assignor to The Taylor-Winfield Corporation, Warren, Ohio, a corporation of Ohio Application May 19, 1944, Serial No. 536,240

1 Claim. (Cl. 251—76)

This invention relates to fluid valves and more particularly to fluid valves of the reciprocating type in which a control member is adapted to have relative sliding movement with respect to a second member having a port or ports for the purpose of closing or opening the port or ports thus controlling the passage of fluid through the valve as will be understood. The construction of fluid valves in such manner that various desirable manufacturing and operating attributes are attained has heretofore presented difficult problems particularly in the case of air valves which are normally intended to be operated in an intermittent manner by means of electromagnetic actuating devices of necessarily limited power output capacity.

In order that variations in the fluid pressure applied to various portions of the controlling element will not unduly affect the automatic operation of the valve it is necessary that the principal parts of the valve be so designed and arranged that a balanced condition is always maintained whereby the force resulting from the fluid pressure and tending to move the control element in one direction is effectively counteracted by an opposing force resulting from the same fluid pressure and tending to move the control element in the opposite direction. Secondly, in valves of the character mentioned it is highly desirable that the slideable interconnection between the principal parts of the valves has a minimum of starting and operating friction while yet being sufficiently closely fitted to maintain the leakage in the valve at a satisfactorily low value. In practical commercial embodiments of fluid valves having the characteristics enumerated it is also highly desirable and in a sense necessary that they be capable of being produced in an inexpensive and expeditious manner.

It is accordingly the primary object of the invention to provide an improved fluid valve which, while being capable of being economically produced and assembled, possesses the desirable characteristics of ease and uniformity of operation without material leakage.

A further object of the invention is the provision of a fluid valve of the general character outlined which is capable of materially longer service life than is the case with valves now used for comparable purposes.

Another object of the invention is the provision of an improved fluid valve of the reciprocating type the parts of which are so constructed and arranged that the assembled valve may be very quickly and expeditiously serviced to restore it to its original degree of operating efficiency.

The above and other objects and advantages of the invention will become apparent upon consideration of the following detailed specification and the accompanying drawing wherein there is fully disclosed certain preferred embodiments of the invention.

Figure 1:
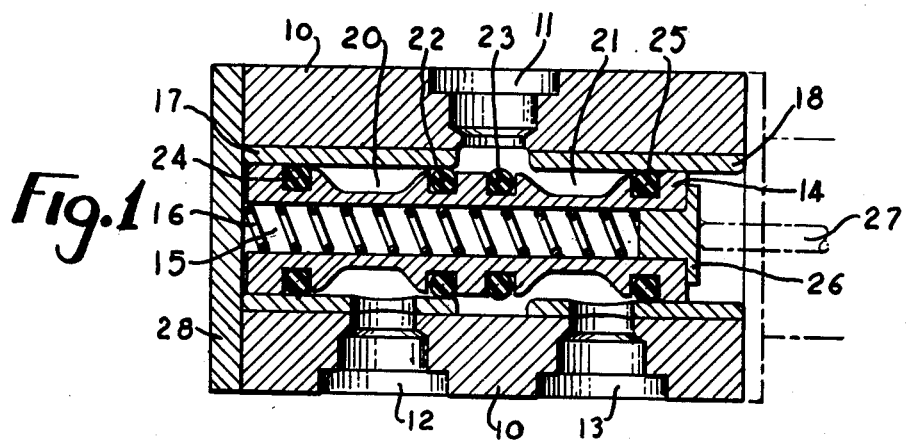
Figure 1 is a view in longitudinal section of a 3-way fluid valve constructed in accordance with the principles of the invention.
Figure 2:
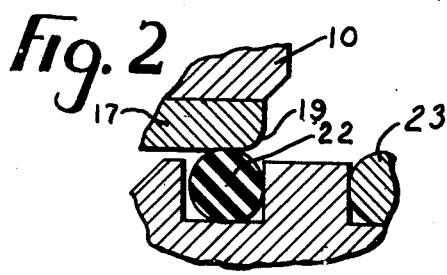
Figure 2 is a fragmentary view, on an enlarged scale, showing a detail of the valve of Figure 1.

Referring to Figures 1 and 2, reference numeral 10 designates a cylindrical housing having a port 11 in its side wall substantially intermediate its ends. Diametrically opposite the port 11 are the longitudinally spaced ports 12 and 13 which are arranged to be automatically connected with the port 11 depending on the operation of the valve. Longitudinally slideable in the housing 10 is a core 14 of tubular construction having a bore 15 disposed centrally therein in which is positioned a coil spring 16.

While the valve may be so constructed that the core 14 bears directly on the surface of the bore through housing 10, I preferably provide liners or sleeves 17 and 18 press-fitted within the bore provided in the housing 10. As shown, sleeves 17 and 18 are identical in construction and extend inwardly from either end of the housing 10—terminating on opposite sides of the port 11. Sleeves 17 and 18 are also provided with openings in their side walls which register with the ports 12 and 13 when the parts are assembled as shown in the drawing. The inner edge of the inner end of each of the sleeves 17 and 18 is rounded or "eased" as shown at 19 in Figure 2 for a purpose to be later described.

It should be understood that if the separable sleeves 17 and 18 are not employed in the assembly the bore through the housing 10 will be enlarged in diameters at the centrally disposed location corresponding with the inner end of the port 11 and, of course, the inner edges of the shoulders separating the large portion of the bore and the end portions of the bore would likewise be rounded or eased. Regardless of whether or not the separable sleeves were employed the surface material of the bore on either side of the centrally disposed enlarged portion is preferably a suitable low friction material such as Bakelite or other synthetic resinous material or, in the alternative, the surface of the bore may be chrome plated, preferably utilizing the porous chrome process, for the purpose of reducing the friction between the bore and the core as will be understood. The use of separable sleeves in the bore of the valve housing 10 is definitely advantageous, however, since the necessity of machining the housing 10 to close tolerances is obviated while the two sleeves, being identical, may be accurately and economically produced by an automatic screw machine as will be readily understood by those skilled in the art.

Core 14 is provided with a pair of longitudinally spaced annular recesses 20 and 21 in its outer surface which recesses are opposite the ports 12 and 13, respectively, in any position of the core with respect to the housing 10. Intermediate the recesses 20 and 21 the core is provided with a pair of longitudinally spaced annular grooves in which are positioned the rings 22 and 23. A similar annular groove is provided at either end of the core 14 outwardly of the recesses 20 and 21 and in the groove adjacent the recess 20 there is positioned a ring 24 while an identical ring 25 is positioned in the groove adjacent the recess 21. As shown, rings 22 through 25 are toroidal in form and have sectional diameters slightly less than the widths of the grooves in which they are seated so that a limited amount of rolling action might take place. The core 14 proper has a loose sliding fit with respect to the aligned bores in the sleeves 17 and 18 and the fluid sealing in the valve is accomplished entirely by the interengagement of the rings 22 through 25 with the contiguous surfaces of the sleeves and core. Rings 22 through 25 are each constructed of resilient, deformable, substantially non-compressible oil and water resistant, and fluid impervious material and I have found that certain synthetic rubbers satisfy all these requirements. I have found, for example, that a synthetic rubber substance known as "neoprene" is particularly well suited for the purposes of the valves constructed according to the principles of my invention. The rings 22 through 25 are molded or otherwise suitably formed in such manner that when lying free they have principal internal diameters slightly smaller than the base diameters of the grooves formed in the core 14. Further, the outer diameters of the rings are slightly larger than the diameters of the bores in the sleeves 17 and 18. I have found in practice that good results may be attained by making these variations approximately .014 inch in each case so that when the parts are assembled the rings are deformed by the same amount between the core and the sleeves throughout the circumferential extent of the rings.

Core 14 is provided with a plug 26 at one end to which is attached or abutted a stem 27 for moving the core to the left as viewed in Figure 1 against the action of the spring 16. A solenoid, not shown, or other suitable operating means may be employed to move stem 27 and at the opposite end of the valve a cover 28, preferably removable, provides an abutment for the fixed end of the spring 16.

In operation, with the core 14 positioned as shown in Figure 1, port 11 is in communication only with port 12 and the passage thus provided is effectively sealed as against the space communicating with the port 12 and the space within the outer end of the sleeve 18 by the inherent resiliency of the rings 22 and 25 which are deformed to fit within the spaces provided for them in the manner stated above. Also the pressure existent in the passage thus provided and tending to move the core 14 to the right by its application against the ring 25 likewise bears against the ring 22 thus tending to move the core in the opposite direction so that the valve is effectively balanced. Moreover, the application of this fluid pressure to the sides of the rings tends to expand the rings in a radially outward direction thus further enhancing the sealing action between the core and fixed part of the valve. Upon the withdrawal of the force applied to the stem 27 spring 16 moves the core 14 to the right causing the ring 22 to roll out of the inner end of the sleeve 17 and the ring 23 to roll into the inner end of the sleeve 18 thus providing a passage by way of recess 20 between port 11 and the port 12 while the ring 23 seals off the passage between port 11 and port 13. The rounded edges of the inner ends of the sleeves 17 and 18 avoids any abrading or cutting action on the rings and it has been found in actual practice that a valve so constructed may be operated over long periods of time without requiring replacement of the rings. When, however, it is desired to install new rings it is only necessary to remove the core, roll the old rings out over the ends of the core, and then roll new rings into place. It should also be observed that by mounting the rings on the core in such a manner that they are allowed limited rolling motion upon operation of the valve in either direction the material of the rings will be maintained in a supple condition for maximum efficiency of operation. This results from the continued "working" of the material of the rings which prevents the rings from taking permanent "sets."

Figure 4:
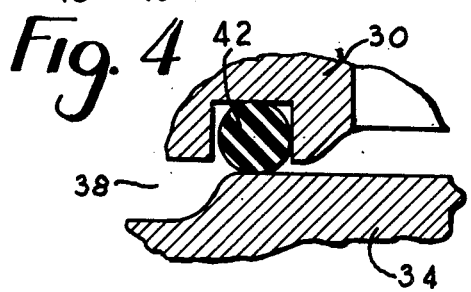
Figure 4 is a fragmentary view, on an enlarged scale, illustrating a detail of the valve of Figure 3.
Figure 3:
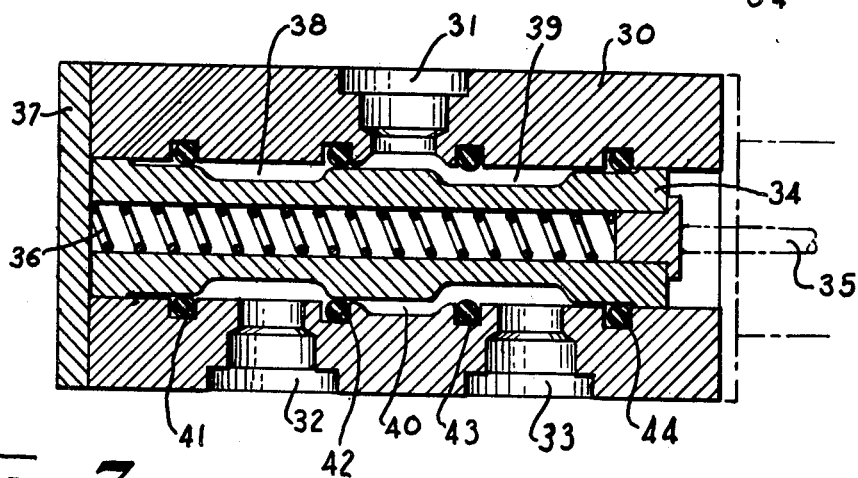
Figure 3 is a longitudinal sectional view of a modified form of fluid valve constructed in accordance with the principles of the invention.

In the embodiments of the invention illustrated in Figures 3 and 4, the housing or body 30 corresponding in general to the housing 10 of the first described embodiment is provided with four annular recesses in its bore. Body 30 is provided with ports 31, 32 and 33 and the operation of the valve is such that either one or the other of the ports 32 and 33 is connected with the port 31. Slidably mounted in the body 30 is the tubular core 34 which is arranged to be moved in one direction, i. e., to the left as viewed in the drawing, by the stem 35 and in the other direction by the compression spring 36 contained within the core. A removable plate 37 closes off one end of the body 30 and provides an abutment for the spring 36 as will be understood.

Core 34 is provided with a pair of longitudinally spaced annular recesses 38 and 39 and an annular recess 40 is provided in the bore of the body 30 in register with the port 31. As shown, the longitudinal length of the recesses 38 and 39 is such that the same are always opposite ports 32 and 33, respectively, in any position of the core while either one or the other of the recesses 38 and 39 is in communication with the recess 40 when the core is in one or the other of its limiting positions. The longitudinal distribution of the annular grooves formed in the body 30 is such that one groove is located adjacent each end of the body while additional grooves are located closely adjacent either longitudinal end of the recess 40. Located within these grooves are the toroidal rings 41, 42, 43 and 44 which are formed of the same material as described above for the rings 22 through 25 and which are similarly deformed to fit within their allotted spaces between the body and core. The inner edges of the recesses 38 and 39 are rounded or eased so that upon longitudinal movement of the core 34 in the body 30 the large portion of the core intermediate the recesses 38 and 39 will be caused to move into one or the other of the rings 42, 43 with a rolling action thus avoiding any abrading action on the rings as explained above in connection with Figures 1 and 2.

With the parts positioned as shown in Figure 3 port 31 communicates with port 33 and the valve is balanced by the sealing action of the rings 42 and 44. Upon removal of the force applied to the operating stem 35 the spring 36 will move the core 34 to the right as viewed in the drawing action and the enlarged portion of the core 34 intermediate the recesses 38 and 39 will move out of the ring 42 and into the ring 43 thus providing communication by way of recesses 38 and 40 between ports 31 and 32. Ring 43 then effectively seals off the space in communication with port 33.

The material of the core 34 or at least the material of the outer surface thereof which comes in contact with any of the rings 41 through 44 is, as in the case of the sleeves 17 and 18 of Figure 1, preferably of a low friction type or the surface is suitably treated to reduce to a minimum the friction between the rings and the core. This material may be of synthetic resin, as suggested above, but in the event homogeneous metal is used for the core such surfaces may be finely finished or chrome plated as also suggested above. By maintaining a finite degree of porosity in the plating an effective carrier for a lubricant is provided.

It should now be apparent that I have provided an improved fluid valve construction which accomplishes the objects initially set out. By the use of relatively simple and readily procurable parts and materials I am enabled to economically produce and expeditiously assemble fluid valves which are easy to operate and which are capable of performing long periods of service without maintenance. A material part of these advantages results from the fact that in manufacturing the parts of the valve no close tolerances need be maintained. Any need for lapping or grinding in of any of the parts is obviated.

While the invention has been illustrated and specifically described as being applied to a fluid valve of the 3-way type it should be clear that the principles of the invention are equally applicable to widely varying types of reciprocating fluid valves irrespective of the number of ports contained in such valves and the nature or character of the sequential connecting together of the ports upon actuation of the valve controlling member. Various other changes and rearrangements may be made without departing from the spirit or scope of the invention. Reference should therefore be had to the appended claim in determining the scope of the invention.

What I claim is:

In a fluid valve comprising a body member having a bore therein, a core member slidably received in said bore, and means to slidably move said core member in said bore; the improvement which consists of an annular recess in one of said members, an annular valving land on the said one of said members adjacent said recess and separated therefrom by an annular rounded shoulder, a circumferential groove in the other of said members so located as to overlie said recess when said core member is in one axial position and to overlie said annular land when said core member is in its other axial position during normal operation of the valve, said other member being loosely interfitted with respect to the said one of said members in the region of said annular land, and a toroidal-shaped fluid impervious ring of resilient and deformable material positioned in said groove, said groove having greater axial length than the thickness of said ring whereby said ring may have limited rolling contact with said rounded shoulder, and an annular recess in said other member adjacent to said groove to coact with said first mentioned annular recess to provide an axial fluid passage upon said core member being moved to cause said groove and ring to overlie said first mentioned passage.

MELVIN M. A. SEELOFF.

REFERENCES CITED

The following references are of record in the file of this patent:

| Number | Name | Date |
|---|---|---|
| 331,789 | Harvey | Dec. 8, 1885 |
| 395,625 | Moore | Jan. 1, 1889 |
| 465,232 | Aiken | Dec. 15, 1891 |
| 948,725 | Freeman | Feb. 8, 1910 |
| 1,016,167 | McCulloch | Jan. 30, 1912 |
| 1,123,273 | Gregersen | Jan. 5, 1915 |
| 1,373,195 | Mead | Mar. 29, 1921 |
| 1,637,135 | Whitsitt | July 26, 1927 |
| 1,988,545 | Donn | Jan. 22, 1935 |
| 2,048,320 | Bennett | July 21, 1936 |
| 2,227,838 | Main | Jan. 7, 1941 |
| 2,243,364 | Trautman | May 27, 1941 |
| 2,358,228 | Hoof | Sept. 12, 1944 |
| 2,360,839 | Barksdale | Oct. 24, 1944 |
| 2,361,801 | Towler | Oct. 31, 1944 |
| 2,414,451 | Christensen | Jan. 21, 1947 |

FOREIGN PATENTS

| Number | Country | Date |
|---|---|---|
| 7,679 | Sweden | Mar. 27, 1897 |
| 95,696 | Germany | of 1898 |